(12) United States Patent
Assmann

(10) Patent No.: US 8,714,649 B2
(45) Date of Patent: May 6, 2014

(54) VEHICLE SEAT, IN PARTICULAR MOTOR VEHICLE SEAT

(75) Inventor: Uwe Assmann, Remsheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 412 days.

(21) Appl. No.: 12/916,690

(22) Filed: Nov. 1, 2010

(65) Prior Publication Data

US 2011/0101755 A1 May 5, 2011

(30) Foreign Application Priority Data

Nov. 4, 2009 (DE) .................. 20 2009 015 235 U

(51) Int. Cl.
  *B60N 2/235* (2006.01)
  *B60N 2/20* (2006.01)
  *B60N 2/22* (2006.01)

(52) U.S. Cl.
  USPC .............. 297/378.12; 297/378.14; 297/378.1

(58) Field of Classification Search
  USPC ............... 297/378.12, 378.14, 378.1, 411.32
  See application file for complete search history.

(56) References Cited

U.S. PATENT DOCUMENTS

| | | | | |
|---|---|---|---|---|
| 5,390,980 A | * | 2/1995 | Premji et al. | 297/378.12 |
| 6,659,559 B1 | * | 12/2003 | Metzler et al. | 297/378.12 |
| 6,695,405 B2 | * | 2/2004 | Senseby et al. | 297/378.1 |
| 7,086,698 B2 | * | 8/2006 | Shiraki | 297/367 R |
| 7,097,253 B2 | * | 8/2006 | Coughlin et al. | 297/378.12 |
| 7,204,556 B2 | * | 4/2007 | Schwerdtner et al. | 297/378.12 |
| 7,387,340 B2 | * | 6/2008 | Wilkening | 297/378.12 |
| 7,887,134 B2 | * | 2/2011 | Shao | 297/378.12 |

FOREIGN PATENT DOCUMENTS

| | | |
|---|---|---|
| DE | 101 43 721 A1 | 3/2003 |
| DE | 10 2004 002 144 A1 | 8/2005 |
| EP | 1 859 706 A1 | 11/2007 |
| WO | WO 2006063720 A1 * | 6/2006 |

* cited by examiner

*Primary Examiner* — David R Dunn
*Assistant Examiner* — Tania Abraham
(74) *Attorney, Agent, or Firm* — McGlew and Tuttle, P.C.

(57) ABSTRACT

A vehicle seat is provided, in particular motor vehicle seat, including a seat part (3) and a backrest (4) which is connected by at least one fitting (10) to the seat part (3) and may be pivoted relative thereto about an axis (A). The fitting includes at least one stop (51, 52, 53) on the seat part (3) and on the backrest (4), which are provided in each case on a structural part (4a) or an adapter (3a) fixed to the structure, and which by cooperation limit the pivoting angle of the backrest (4). At least one first stop (51), of the stops (51, 52, 53) provided, is integrally formed with the structural part (4a) or adapter (3a), as this least one first stop (51) is produced from the material of the structural part (4a) or adapter (3a).

20 Claims, 3 Drawing Sheets

VEHICLE SEAT, IN PARTICULAR MOTOR VEHICLE SEAT

CROSS REFERENCE TO RELATED APPLICATIONS

This application claims the benefit of priority under 35 U.S.C. §119 of German Utility Model Application DE 20 2009 015 235.9 filed Nov. 4, 2009, the entire contents of which are incorporated herein by reference.

FIELD OF THE INVENTION

The invention relates to a vehicle seat, in particular a motor vehicle seat, having a seat part and a backrest which is connected by means of at least one fitting to the seat part and may be pivoted relative thereto about an axis and with stops which by cooperation limit the pivoting angle of the backrest.

BACKGROUND OF THE INVENTION

A vehicle seat of this type is disclosed in EP 1 859 706 A1. A stop is welded in each case to the seat part and to the backrest. If the backrest is pivoted flat to the rear, the two stops come to bear against one another and, as a result, support the backrest.

SUMMARY OF THE INVENTION

The object of the invention is to improve a vehicle seat of the aforementioned type with regard to weight, costs and strength. This object is achieved according to the invention by a vehicle seat in particular a motor vehicle seat, comprising a seat part with a seat structure or a seat structure and seat part adapter fixed to the a seat structure and a backrest with a backrest structure or a backrest structure and a backrest adapter fixed to the backrest structure. The backrest part is connected by means of at least one fitting to the seat part and may be pivoted relative thereto about an axis. At least one stop is provided in each case on the seat part or backrest part to provide cooperating stops to limit the pivoting angle of the backrest. The stops include at least one first stop integrally formed with the structure or adapter based on the first stop being produced from the material of the structure or adapter.

As at least one first stop of the stops provided is integrally formed with the structural part or adapter, as it is produced from the material of the structural part or adapter, an additional part is dispensed with, which otherwise might have to be specifically made and fastened to the structural part or adapter. This causes problems, in particular with thin sheet metal parts. Due to the integral configuration, the first stop is attached and supported in a stable manner, so that it does not bend back. A U-shaped profile, preferably also in the second and optionally the third stop, considerably increases the stop surface. High stop loads may be absorbed. Overall, weight and costs are reduced.

The invention may be used for latching fittings or for geared fittings, as are used in vehicle seats for adjusting the inclination of the backrest or for other adjustments.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
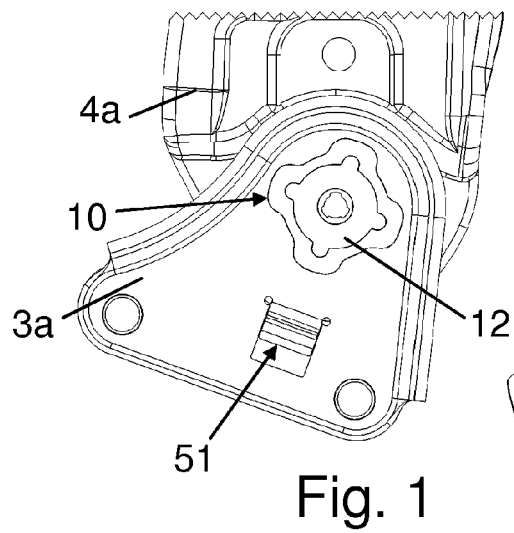
FIG. 1 is a partial view of the exemplary embodiment from the outside.
Figure 2:
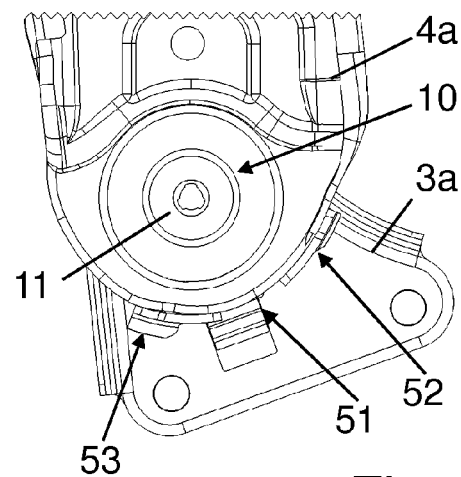
FIG. 2 is a partial view of the exemplary embodiment from the inside.
Figure 3:
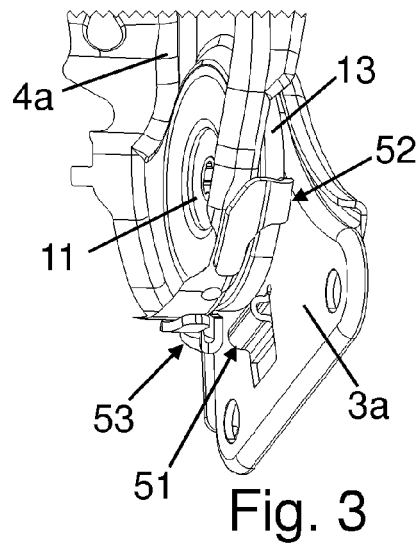
FIG. 3 is a perspective partial view of the exemplary embodiment.
Figure 4:
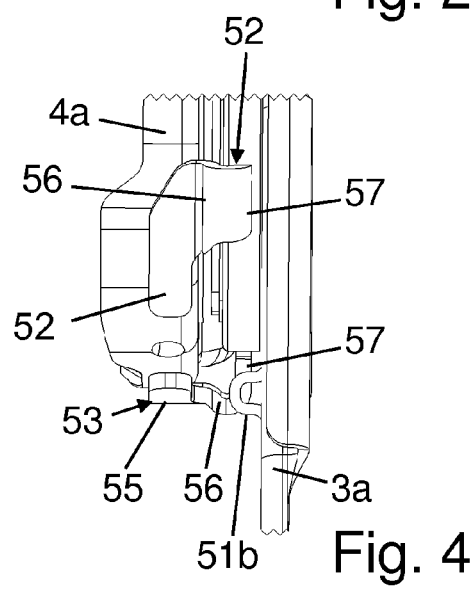
FIG. 4 is a partial view of the exemplary embodiment from the front.
Figure 5:
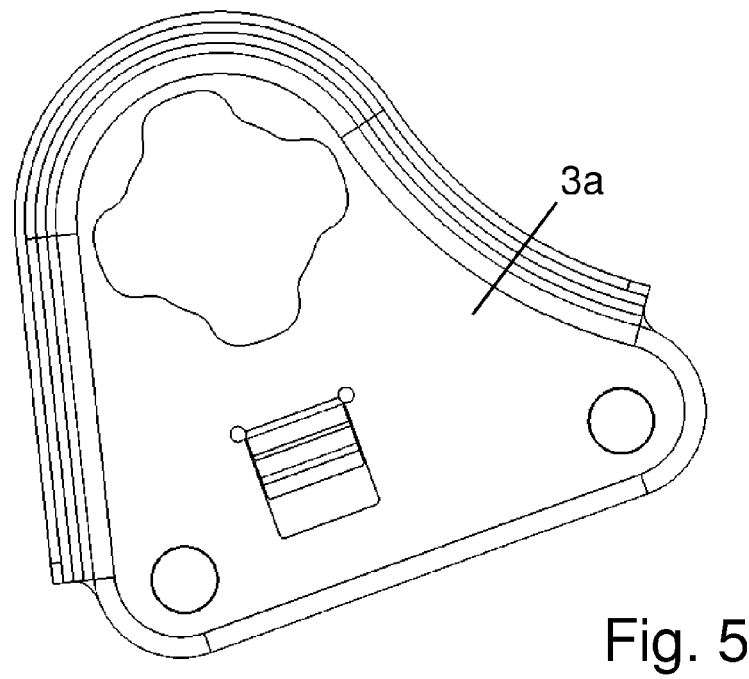
FIG. 5 is a front view of an adapter.

Referring to the drawings in particular, a vehicle seat 1 for a motor vehicle comprises a seat part 3 and a backrest 4 which may be pivoted relative to the seat part 3—in particular for adjusting the inclination thereof. For adjusting the inclination of the backrest 4 a transmission bar 7 is rotated manually, for example by means of a hand lever 5, said transmission bar being arranged horizontally in the transmission region between the seat part 3 and the backrest 4. The transmission bar 7 engages in a fitting 10 on both sides of the vehicle seat 1.

The fitting 10 has a first fitting part 11 and a second fitting part 12, which may be rotated relative to one another. By mounting the fitting 10, the first fitting part 11 is, for example, fixedly connected to the structure of the backrest 4, i.e. fixed to the backrest part. The second fitting part 12 is thus fixedly connected to the structure of the seat part 3, i.e. fixed to the seat part. The association of the fitting parts 11 and 12 may, however, also be interchanged, i.e. the first fitting part 11 could thus be fixed to the seat part and the second fitting part 12 fixed to the backrest.

The fitting 10 is configured as a latching fitting, in which a first fitting part 11 and a second fitting part 12 may be locked together and after being unlocked may be rotated relative to one another about an axis A, as is disclosed, for example, in DE 10 2006 015 560 B3. The axis A aligned with the transmission bar 7, defines the directional information of a cylindrical coordinate system used.

The two fitting parts 11 and 12 may in each case be approximately inscribed in a circular disc shape. The two metal fitting parts 11 and 12 preferably consist of steel. For absorbing the axially acting forces, i.e. for holding together the fitting parts 11 and 12, a clamping ring 13 is provided. Such a connection by means of a clamping ring is disclosed, for example, in U.S. Pat. No. 6,799,806 A. The preferably metal clamping ring 13 is fixedly connected to one of the two fitting parts 11 and 12, in the present case to the second fitting part 12, for example welded or—as it encompasses the second fitting part 12 connected thereto—crimped. On one front face, the clamping ring 13 has a radially inwardly bent edge, by means of which it radially encompasses externally the other of the two fitting parts 11 and 12, in the present case the first fitting part 11, optionally by the interposition of a separate sliding ring, without hindering the relative movement of the two fitting parts 11 and 12. From the structural point of view, therefore, the two fitting parts 11 and 12 form together (with the clamping ring 13) a disc-shaped unit.

The second fitting part 12 has—in the present case four—guide segments 14, which in each case, in pairs, laterally guide a bolt 16 in the radial direction by means of linear guide surfaces. The bolts 16—in the present case a total of four—are arranged offset to one another—in the present case respectively by 90°—in a constructional space defined between the two fitting parts 11 and 12. The bolts 16 are provided at their radial external end with teeth which may be brought into engagement with (drop into) a toothed ring 17 of the first fitting part 11 formed as an internal gear. When the toothed ring 17 and the bolts 16 cooperate, the fitting 10 is locked. The guide segments 14 bear against the toothed ring 17 of the first fitting part 11 with one respective curved bearing surface, as a result of which the two fitting parts 11 and 12 bear against one another.

In the center of the fitting 10 a drive element 21 is arranged which is, for example, made of plastics material, and which is located fixedly in terms of rotation by means of a central bore 23—or at least coupled for take-up—on the transmission bar 7 and is rotatably mounted on at least one of the two fitting parts 11 and 12, in the present case the first fitting part 11, more specifically in a central opening thereof. On the drive element 21 an eccentric 27 is located fixedly in terms of rotation or at least coupled for take-up, which is arranged in the constructional space defined between the fitting parts 11 and 12. A spring arrangement 35, for example two coil springs nested one inside the other, is arranged in a central receiver of one of the two fitting parts 11 and 12, in the present case of the second fitting part 12, and in the present case supported on the outside. The spring arrangement 35 acts upon the eccentric 27, in the present case as it is located on the inside fixedly in terms of rotation on the drive element 21. Such a spring arrangement 35 is, for example, disclosed in DE 10 2005 046 807 B3, where it consists of two coil springs nested one inside the another. The eccentric 27 acted upon by the spring arrangement 35 acts on the radially movable bolts 16 and acts upon said bolts so that they are radially forced to the outside, in order to drop into the toothed ring 17, whereby the fitting 10 is locked.

A cam disc 36 is axially arranged in the constructional space between the bolts 16 and the first fitting part 11 and in the present case is located fixedly in terms of rotation on the eccentric 27. The cam disc 36 has—in the present case four—control paths which in each case cooperate with a lug 38 of each bolt 16. The lugs 38 thus protrude in the axial direction from the bolts 16 assigned thereto. The drive element 21 is axially secured by a retaining ring 43, which is fastened to the drive element 21, preferably clipped on, when the fitting 10 is mounted. The drive element 21 and the retaining ring 43 have one respective flange which in each case bears on the outside of one of the two fitting parts 11 or 12, and which acts as a seal. When rotating the drive element 21—and the eccentric 27 driven thereby and the cam disc 36—(by a few degrees) counter to the force of the spring arrangement 35, the cam disc 36 pulls the bolts 16 radially inwards, i.e. out of the toothed ring 17, whereby the fitting 10 is unlocked and the two fitting parts 11 and 12 are able to be rotated relative to one another about the axis A. As a result, the inclination of the backrest 4 is able to be adjusted between a plurality of positions of use suitable for seating use.

In two-door motor vehicles, by freely pivoting the backrest 4, the access to a rear seat row is intended to be facilitated, for which the unlocked backrest 4 is pivoted from one of the positions of use to the front into a freely pivoted position which is not suitable for seating use. It increases the ease of operation if the hand lever 5—or a further actuating element—does not have to be held during the entire free pivoting movement and the fittings are only locked once in the freely pivoted position. To this end, in the fitting 10, an annular freely pivoting control element may be optionally provided between the cam disc 36 and the first fitting part 11 about the axis A, said freely pivoting control element being connected fixedly in terms of rotation to the first fitting part 11. The freely pivoting control element 48 has stop tracks, which cooperate with the lugs 38 of the bolts 16, as they define the movement thereof radially to the outside, or allow said lugs to drop in unhindered. In order to be able to pivot the backrest 4 freely beyond the angle between two bolts 16, the lugs 38 of the bolts 16 are arranged alternately at different spacings radially to the outside or radially to the inside on the bolts 16 assigned thereto, so that adjacent lugs 38 cooperate with different stop tracks. Accordingly, two different embodiments of the bolts 16 are provided. Details are disclosed in DE 10 2006 015 560 B3.

Due to the arrangement of the vehicle seat 1 in the interior of a motor vehicle, the backrest 4 is not able to pivot in any manner. In order to avoid damage, the pivoting range of the backrest 4 is specifically limited, and namely when adjusting the inclination for seating use and optionally also when freely pivoted, with table positions (backrest 4 folded flat to the front) or reclined positions (backrest 4 folded flat to the rear). To this end, on both vehicle seat sides, a lower first stop 51 is provided, on the one hand, on a structural part of the seat part 3 or on an adapter 3a of the seat part 3 fixed to the structure (as is the case here) and, on the other hand, a front second stop 52 and a rear third stop 53 are provided on a structural part 4a of the backrest 4 (as is the case here) or on an adapter of the backrest 4 fixed to the structure. The structural part 4a of the backrest 4 is fixedly connected to the first fitting part 11 whilst the adapter 3a fixed to the structure is fixedly connected to the second fitting part 12.

On each vehicle seat side (or alternatively only on one vehicle seat side) three stops 51, 52 and 53 are arranged in each case in the vicinity of the associated fitting 10. The radial spacing from the axis A is greater than the radius of the fitting 10, in order to reduce the lever action of the backrest 4 in comparison with alternative stops on the fitting 10.

Figure 6:
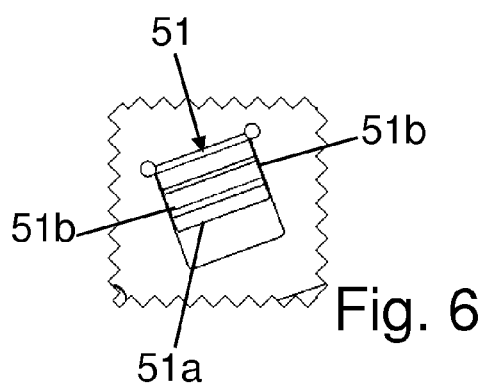
FIG. 6 is a cutaway view showing a first stop without bonding points.
Figure 7:
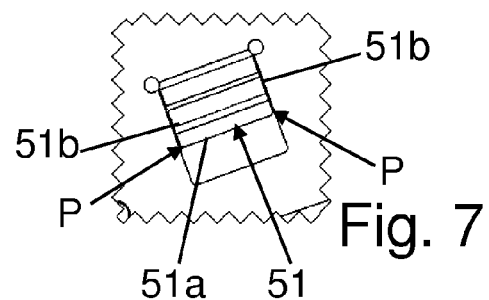
FIG. 7 is a cutaway view showing a first stop with bonding points.
Figure 8:
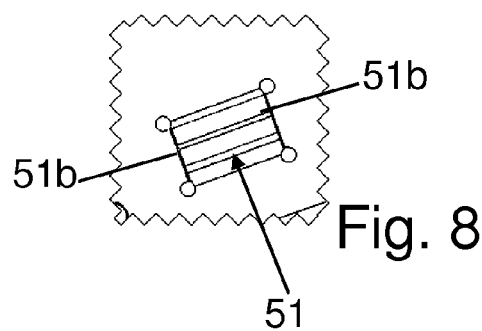
FIG. 8 is a cutaway view showing a deep-drawn first stop.
Figure 9:
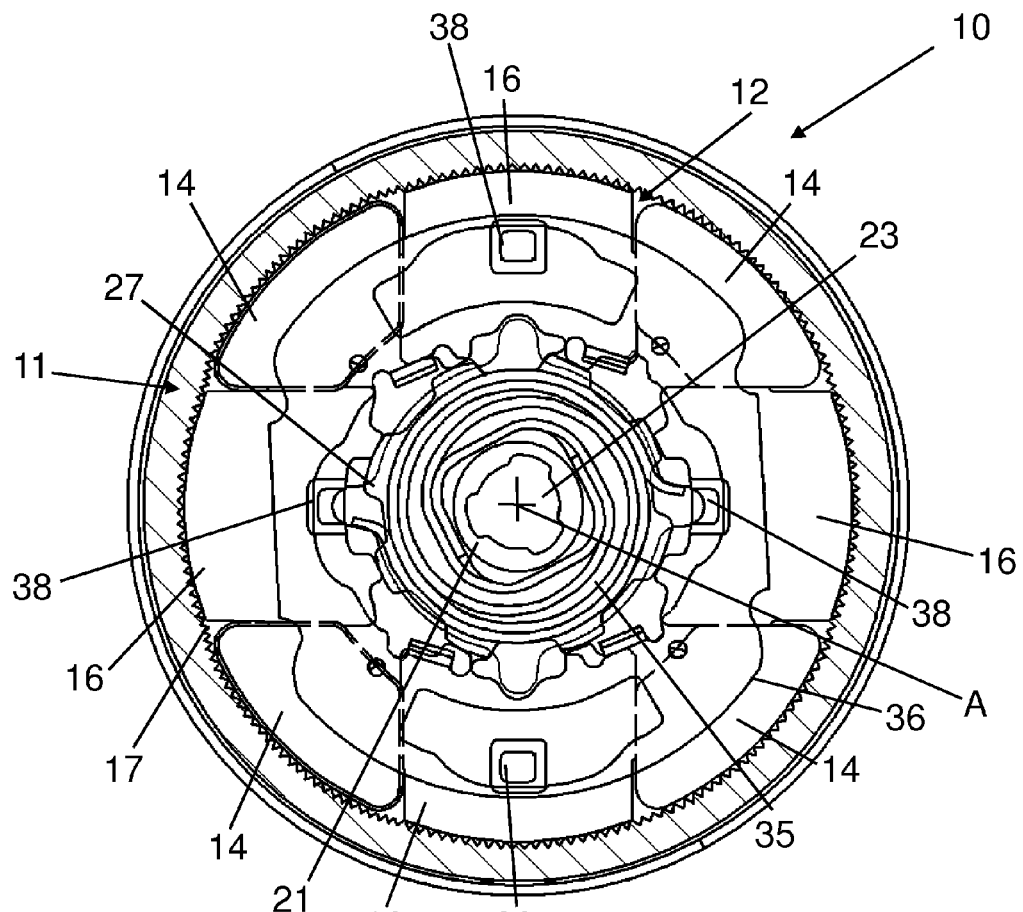
FIG. 9 is a radial sectional view through a fitting.
Figure 10:
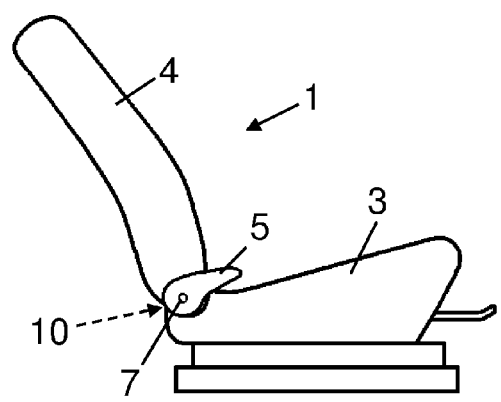
FIG. 10 is a schematic view of a vehicle seat.

The first stop 51 is axially produced from the material of the adapter 3a, i.e. configured integrally therewith. To this end, the first stop 51 is stamped out as a rectangular tongue on three sides in the plane of the adapter 3a (or cut out in a different manner), one free end 51a and two lateral stop surfaces 51b being produced. The free end 51a is displaced in the plane of the adapter 3a which, after mounting, extends perpendicular to the axial direction, whereby the intermediate region of the tongue bulges axially out of said plane and the two stop surfaces 51b face in the peripheral direction, axially offset to the adapter 3a and opposing one another. This state shown in FIG. 6 may already be the finished first adapter 3a, or an intermediate step during production of the first adapter 3a. In the last case, the free end 51a is also fixed by means of bonding points P, as shown in FIG. 7, i.e. spot welded to the part of the adapter 3a adjacent to the stop surfaces 51b. The first adapter 3a is stabilized as a result. Alternatively, the first adapter 3a is deep-drawn, as shown in FIG. 8. In all three cases the first stop 51 is of U-shaped profile—relative to the stop surfaces 51b.

The second stop 52 and the third stop 53 are constructed mirror-symmetrically to one another (in a chiral configuration) relative to the peripheral direction. The two stops 52 and 53 may be produced in the same manner as the first stop 51, i.e. may be produced axially from the material of the structural part 4a, or they are formed as separate components formed integrally per se and fastened to the structural part 4a. An elongate connecting portion 55 extending in the peripheral direction is in each case connected to an axially displaced edge of the structural part 4a (integrally or by a fastening technique known per se). A transmission portion 56 protrudes axially from this connecting portion 55—at one end—said transmission portion extending in the axial direction as far as the fitting 10 (i.e. as far as the clamping ring 13). A stop portion 57 is adjoined to the transmission portion 56, which is bent over from the transmission portion 56 axially to the inside, so that viewed in the peripheral direction a U-shaped profile is produced. Thus the U-shaped profiles of the first stop 51 and of the stop portion 57 are arranged opposite one another.

During assembly of the vehicle seat 1, the three stops 51, 52 and 53 are moved into relative positions with one another, so that the second stop 52 and the third stop 53 may cooperate in each case in the peripheral direction with just one of the two stop surfaces 51b of the first stop 51, namely the front second stop 52 and the front stop surface 51b when the backrest 4 is pivoted to the front and the rear third stop 53 and the rear stop surface 51b when the backrest 4 is pivoted to the rear.

The invention in the present case is explained with reference to latching fittings. It may, however, also be used for a geared fitting, the external shape thereof coinciding substantially with the present fitting 10, and the inner structure thereof, for example, being disclosed in DE 44 36 101 A1, this internal structure being independent of whether the fitting is formed with elongate flanges for fastening or is disc-shaped. In such a geared fitting with a (self-locking) eccentric epicyclic gear, a toothed ring is formed on one of the two fitting parts and a gear wheel is formed on the other of the two fitting parts, which mesh with one another, whereby the two fitting parts are in geared connection with one another. A rotatably mounted peripheral eccentric driven by a drive element then produces a relative rolling movement of the gear wheel and toothed ring. The rolling movement acts as a relative rotation with a superimposed wobble motion, which spatially alters the position of the axis A.

While specific embodiments of the invention have been described in detail to illustrate the application of the principles of the invention, it will be understood that the invention may be embodied otherwise without departing from such principles.

APPENDIX

List of Reference Numerals

1 Vehicle seat
3 Seat part
3a Adapter
4 Backrest
4a Structural part
5 Hand lever
7 Transmission bar
10 Fitting
11 First fitting part
12 Second fitting part
13 Clamping ring
14 Guide segment
16 Bolt
17 Toothed ring
21 Drive element
23 Bore
27 Eccentric
35 Spring arrangement
36 Cam disc
38 Lug
43 Retaining ring
51 First stop
51a Free end
51b Stop surface
52 Second stop
53 Third stop
55 Connecting portion
56 Transmission portion
57 Stop portion
A Axis
P Bonding point

What is claimed is:

1. A vehicle seat comprising:
    a seat part;
    a fitting;
    a backrest connected by the fitting to the seat part and pivoted relative to the seat part about an axis;
    at least one stop on the seat part and on the backrest, each stop being provided on a structural part or an adapter fixed to the structural part, the at least one stop on the seat part and the at least one stop on the backrest cooperating to limit a pivoting angle of the backrest, one of the at least one stop on the seat part and the at least one stop on the backrest including one first stop integrally formed with the structural part or the adapter with the first stop axially produced by cutting out or stamping out a tongue from a cut-out or stamped window from the material of the structural part or the adapter, said tongue axially protruding from said cut-out or stamped window and said tongue having one free end and two lateral stop surfaces, wherein said tongue comprises a U-shaped profile protruding from a plane of said cut-out or stamped window, said U-shaped profile of said tongue protruding from said plane of said window forming said two lateral stop surfaces.

2. A vehicle seat according to claim 1, wherein the end of the U-shaped free end which extends into a cut-out or stamped-out window is laterally fixed at the inner surface of the window.

3. A vehicle seat according to claim 1, wherein the first stop is produced axially.

4. A vehicle seat according to claim 1, wherein the one of the at least one stop on the seat part and the at least one stop on the backrest include a second stop comprising:
    a connecting portion which extends in a peripheral direction and is connected to the structural part or to the adapter;
    a transmission portion protruding axially from the connecting portion; and
    a stop portion adjacent to the connecting portion.

5. A vehicle seat according to claim 4, wherein:
    the stop portion is of U-shaped profile, the U-shaped profile of the stop portion being arranged in a direction opposite to the U-shaped profile of the first stop.

6. A vehicle seat according to claim 1, wherein the first stop is associated with the seat part and cooperates with a second stop and third stop associated with the backrest to limit the pivoting angle of the backrest in a front or a rear direction.

7. A vehicle seat according to claim 1, wherein the fitting comprises two fitting parts which may be rotated relative to one another, one of the fitting parts being connected to the structural part or the adapter of the seat part and the other of the fitting parts being connected to the structural part or the adapter of the backrest.

8. A vehicle seat according to claim 7, further comprising a clamping ring axially holding the two fitting parts together.

9. A vehicle seat according to claim 7, wherein on a first of the two fitting parts a toothed ring is formed and on the second of the two fitting parts guide segments are formed for guiding radially displaceable bolts, the bolts cooperating with the toothed ring to lock the fitting.

10. A vehicle seat according to claim 7, wherein on a first of the two fitting parts a toothed ring is formed and on the second of the two fitting parts a gear wheel meshing with the toothed ring is formed, whereby the two fitting parts are in geared connection with one another, and a rotatably mounted peripheral eccentric driven by a drive element produces a relative rolling movement of the gear wheel and the toothed ring.

11. A motor vehicle seat comprising:
a seat part comprising a seat structure or a seat structure and a seat part adapter fixed to the seat structure, said seat structure or said seat structure and said seat part adapter comprising a seat part surface;
a fitting;
a backrest comprising a backrest structure or a backrest structure and a backrest adapter fixed to the backrest structure, the backrest being pivotably connected to the seat part by the fitting, said backrest structure or said backrest structure and said adapter comprising a backrest surface;
a seat stop on the seat part; and
a backrest stop on the backrest, the backrest stop cooperating with the seat stop to limit a pivoting angle of the backrest, one of the seat stop and the backrest stop being a first stop integrally formed with the respective seat structure or seat part adapter or backrest structure or backrest adapter to form a one-piece seat or backrest structure and being axially produced by deep drawing, cutting or stamping out from the material of the respective seat structure or seat part adapter or backrest structure or backrest adapter, said first stop comprising one free end, a U-shaped profile and two lateral stop surfaces, each of said two lateral stop surfaces comprising a U-shaped contour, each of said two lateral stop surfaces extending in an axial direction of said respective seat structure or seat part adapter or backrest structure or backrest adapter, wherein a portion of each of said two lateral stop surfaces is located adjacent to a portion of said respective seat structure or seat part adapter or backrest structure or backrest adapter, one of said seat part surface and said backrest surface defining at least a portion of said first stop.

12. A motor vehicle seat according to claim 11, wherein the first stop is a tongue with a tongue free end displaced relative to adjacent portions of the respective seat structure or seat part adapter or backrest structure or backrest adapter, said one of said seat part surface and said backrest surface defining an opening, at least a portion of said tongue free end being arranged in said opening.

13. A motor vehicle seat according to claim 11, wherein one of one of the seat stop and the backrest stop is a second stop comprising:
a connecting portion which extends in a peripheral direction and is connected to the respective seat structure or seat part adapter or backrest structure or backrest adapter;
a transmission portion protruding axially from the connecting portion; and
a stop portion adjacent to the connecting portion.

14. A motor vehicle seat according to claim 11, wherein the first stop is associated with the seat part and cooperates with a second stop and third stop associated with the backrest to limit the pivoting angle of the backrest in a front or a rear direction, said first stop being located between said second stop and said third stop with respect to a circumferential direction of said fitting.

15. A motor vehicle seat according to claim 11 wherein the fitting comprises two fitting parts which may be rotated relative to one another, one of the fitting parts being connected to the seat structure or seat part adapter and the other of the fitting parts being connected to the backrest structure or backrest adapter.

16. A vehicle seat according to claim 11, wherein said first stop has a free end, wherein a portion of the free end extends into a cut-out or stamped-out window of the respective seat structure or seat part adapter or backrest structure or backrest adapter, said portion of said U-shaped free end being laterally fixed at an inner surface of the window.

17. A motor vehicle seat comprising:
a seat part comprising a seat structure or a seat structure and a seat part adapter fixed to the seat structure, said seat structure or said seat structure and said seat part comprising a seat part portion defining a seat stop having two lateral stop surfaces, each of said two lateral stop surfaces comprising a U-shaped contour, each of said two lateral stop surfaces extending in an axial direction of said seat part portion, wherein at least a portion of each of said two lateral stop surfaces is located at a spaced location from said seat part portion;
a fitting;
a backrest comprising a backrest structure or a backrest structure and a backrest adapter fixed to the backrest structure, the backrest being pivotably connected to the seat part by the fitting, said backrest structure or said backest structure and said backrest adapter comprising a backrest part portion defining a first backrest stop and a second backrest stop, said seat stop being arranged between said first backrest stop and said second backrest stop with respect to a circumferential direction of said fitting, said first backrest stop and said second backrest stop cooperating with said two lateral stop surfaces of said seat stop to limit a pivoting angle of said backrest.

18. A motor vehicle seat in accordance with claim 17, wherein said seat stop is integrally formed with said seat structure or seat part adapter to form a one-piece seat structure or seat part adapter planar structure, wherein said seat stop is produced by one of deep drawing, cutting and stamping out from the material of the seat structure or the seat structure and the seat part adapter, said first backrest stop and said second backrest stop being integrally formed with said backrest structure or backrest structure and said backrest adapter to form a one-piece backrest planar part, wherein said first backrest stop and said second backrest stop are produced by one of deep drawing, cutting and stamping out from the material of the backrest structure or the backrest structure and the backrest adapter.

19. A vehicle seat according to claim 17, wherein said seat stop comprises a free end, said free end extending into a cut-out or stamped-out window of the seat structure or the seat structure and the seat part adapter, said portion of said free end being laterally fixed at an inner surface of the window.

20. A vehicle seat according to claim 17, wherein said each of said two lateral stop surfaces comprises a fixed end portion and a free end portion, said seat portion comprising a planar portion, a first seat portion surface, a second seat portion surface and a third seat portion surface, each of said first seat portion surface, said second seat portion surface and said third seat portion surface being perpendicular to said planar portion, at least said first seat portion surface, said second seat portion surface and said third seat portion surface defining a seat portion opening, wherein said free end portion is located at a spaced location from said second seat portion surface, at least a portion of said free end being arranged in said seat portion opening, said fixed end portion being fixed at said seat portion, said first end portion being located opposite said second seat portion surface.

* * * * *